US 7,407,993 B2

(12) United States Patent  (10) Patent No.: US 7,407,993 B2
Harrison  (45) Date of Patent: *Aug. 5, 2008

(54) COMPOSITIONS AND METHODS FOR RESISTING SOIL EROSION AND FIRE RETARDATION

(75) Inventor: Scott Harrison, Bakersfield, CA (US)

(73) Assignee: Terra Novo, Inc., Bakersfield, CA (US)

( * ) Notice: Subject to any disclaimer, the term of this patent is extended or adjusted under 35 U.S.C. 154(b) by 640 days.

This patent is subject to a terminal disclaimer.

(21) Appl. No.: 10/971,654

(22) Filed: Oct. 22, 2004

(65) Prior Publication Data
US 2005/0148684 A1 Jul. 7, 2005

Related U.S. Application Data

(63) Continuation-in-part of application No. 10/368,904, filed on Feb. 18, 2003, now Pat. No. 6,835,761, which is a continuation of application No. 09/897,093, filed on Jun. 29, 2001, now Pat. No. 6,562,882.

(51) Int. Cl.
C09K 17/20 (2006.01)
C09K 17/32 (2006.01)
C09K 17/52 (2006.01)

(52) U.S. Cl. .................. 523/132; 524/13; 524/35; 524/831

(58) Field of Classification Search .............. 523/132; 524/13, 35
See application file for complete search history.

(56) References Cited

U.S. PATENT DOCUMENTS

| 3,950,179 | A | 4/1976 | Schneider |
| 3,959,975 | A | 6/1976 | Graf |
| 3,971,222 | A | 7/1976 | Griffith, Jr. |
| 4,001,033 | A | 1/1977 | Anthone et al. |
| 4,022,633 | A | 5/1977 | Schneider |
| 4,028,897 | A | 6/1977 | Bennett |
| 4,071,400 | A | 1/1978 | Jankowiak |
| 4,072,020 | A | 2/1978 | Bishop |
| 4,106,296 | A | 8/1978 | Leonard, Jr. et al. |
| 4,107,112 | A | 8/1978 | Latta, Jr. et al. |
| 4,168,593 | A | 9/1979 | Jankowiak |
| 4,243,563 | A | 1/1981 | Ferm |
| 4,277,203 | A | 7/1981 | Reed, Jr. et al. |
| 4,297,810 | A | 11/1981 | Hansford |
| 4,417,992 | A | 11/1983 | Battacharyya et al. |
| 4,592,931 | A | 6/1986 | Cargle |
| 4,606,675 | A | 8/1986 | Mitani et al. |
| 4,669,920 | A | 6/1987 | Dymond |
| 4,705,816 | A | 11/1987 | Pole |
| 4,797,145 | A | 1/1989 | Wallace et al. |
| 4,799,549 | A | 1/1989 | Vinot et al. |
| 4,826,350 | A | 5/1989 | Kambe |
| 4,941,924 | A | 7/1990 | Merritt |
| 5,000,789 | A | 3/1991 | Merritt |
| 5,012,974 | A | 5/1991 | Johnson |
| D323,511 | S | 1/1992 | Swisher, Jr. |
| 5,181,797 | A | 1/1993 | Circeo, Jr. et al. |
| 5,219,246 | A | 6/1993 | Coutts et al. |
| 5,336,315 | A | 8/1994 | Cuscurida et al. |
| 5,364,206 | A | 11/1994 | Marienfeld |
| 5,366,022 | A | 11/1994 | Meyer et al. |
| 5,368,410 | A | 11/1994 | Ferraiolo |
| 5,415,795 | A | 5/1995 | Roe et al. |
| 5,450,985 | A | 9/1995 | Meuleman |
| 5,516,830 | A | 5/1996 | Nachtman et al. |
| 5,567,087 | A | 10/1996 | Theisen |
| 5,670,567 | A | 9/1997 | Lahalih |
| 5,746,546 | A | 5/1998 | Hubbs et al. |
| 5,770,639 | A | 6/1998 | Ritter et al. |
| 5,779,782 | A | 7/1998 | Spittle |
| 5,795,377 | A | 8/1998 | Tanner et al. |
| 5,824,725 | A | 10/1998 | Lahalih |
| 5,860,770 | A | 1/1999 | Hunt |
| 5,904,447 | A | 5/1999 | Sutton et al. |
| 5,942,029 | A | 8/1999 | Spittle |
| 5,988,942 | A | 11/1999 | Atkinson |
| 6,029,395 | A | 2/2000 | Morgan |
| 6,042,305 | A | 3/2000 | Novich |
| 6,071,411 | A | 6/2000 | Grott |

(Continued)

OTHER PUBLICATIONS

San Diego State University Soil Erosion Research Laboratory, "Results from a Study of EarthGuard HM Hydraulic Matrix for Soil Stabiization: Runoff Characteristics and Sediment Retention Under Simulated Rainfall Conditions", Dec. 18, 2000, 14 pages, SDSU/SERL, San Diego, California.

(Continued)

Primary Examiner—Tae H Yoon
(74) Attorney, Agent, or Firm—Stetina Brunda Garred & Brucker

(57) ABSTRACT

Compositions and methods for concomitantly resisting fire and soil erosion. The compositions comprise an aqueous mixture of a polymer mixed with an organic material. The polymer preferably comprises polyacrylamide or a copolymer of polyacrylamide having anionic functional groups. The organic material comprises either cellulose, mulch and/or seed and mulch. The methods of the present invention comprise providing or forming an aqueous mixture of the compositions of the present invention and applying them to an area of land sought to be provided with soil erosion and/or fire resistant properties.

9 Claims, 6 Drawing Sheets

U.S. PATENT DOCUMENTS

| | | | |
|---|---|---|---|
| 6,076,997 | A | 6/2000 | First et al. |
| 6,093,682 | A | 7/2000 | Arendt et al. |
| 6,287,496 | B1 | 9/2001 | Lownds |
| 6,360,478 | B1 | 3/2002 | Spittle |
| 6,395,051 | B1 | 5/2002 | Arnold et al. |
| 6,397,519 | B1 | 6/2002 | Snowden et al. |
| 6,562,882 | B2* | 5/2003 | Harrison ............... 523/132 |
| 6,589,442 | B1 | 7/2003 | Wilson |
| 6,835,761 | B2* | 12/2004 | Harrison ............... 523/132 |
| 2001/0001634 | A1 | 5/2001 | Gamliel et al. |
| 2001/0018047 | A1 | 8/2001 | Rose et al. |
| 2002/0129544 | A1 | 9/2002 | Bargiacchi |
| 2002/0132884 | A1 | 9/2002 | Offerman |
| 2002/0188042 | A1 | 12/2002 | Haile |
| 2003/0205072 | A1 | 11/2003 | Van Der Merwe |

OTHER PUBLICATIONS

San Diego State University Soil Erosion Research Laboratory, "Results from a Study of EarthGuard Fiber Matrix for Soil Stabiization: Runoff Characteristics and Sediment Retention Under Simulated Rainfall Conditions", Oct. 14, 2002, 15 pages, SDSU/SERL, San Diego, California.

Trenkel, Jan et al., PAM and/or Low Rates of Straw Furrow Mulching to Reduce Soil Erosion and Increase Water Infiltration in a Furrow Irrigated Field, 1995 Trial, Malheur Experiment Station, Oregon State University, 10 page printout from website at www.cropinfo.net Mar. 11, 2003.

"Profile Products—Wood Cellulose w/Tack III—Tackifier—Hydraulic Mulches", Profile Products, LLC, Buffalo Grove, Illinois, 11 page website printout from www.terra-mulch.com, Mar. 11, 2003.

Roa-Espinosa, A. et al., Sediment and Runoff Control on Construction Sites Using Four Application Methods of Polyacrylamide Mix, National Conference on Tools for Urban Water Resource Management and Protection, Chicago, Feb. 7-10, 2000, p. 278-283, University of Wisconsin.

Storey, B.B., et al., Compost and Wood Chips with Tackifier for Erosion Control, Abstract 62, reprinted from Williams, James R., etc., The Sixth International Symposium on Environmental Concerns in Rights-of-Way Management, Copyright 1997, with permission from Elsevier Science.

Land and Water, Company Listings, Nov./Dec. 1992 page 47 with 4 pages of miscellaneous product information for EXACT-TAC.

Land and Water, Nov./Dec. 1992 page 15 advertisement regarding "Soil Seal" acrylic tackifier for mixture with seed, mulch, fertilizer, and water.

Material Safety Data, Sep. 5, 1997, Golden Gate Products, Davis, CA; 4 pages.

Fisch-Bond A Professional's Tackifier, Sep. 2002, Golden Gate Products, Davis, CA.; 3 pages.

Aquashed-ADC Material Safety Data Sheet, Aug. 31, 1997, Aqua-Shed Technologies, Inc., Florence, SC.; 4 pages.

Finn E-Tack, For Normal to Moderate Slope Conditions, Apr. 6, 2000, Material Safety Data Sheet, U.S. Dept. of Labor Occupational Safety and Health Administration; 3 pages.

Hedro Seed Kit 2.5, Material Safety Data Sheet, Jan. 1, 2000, Poulenger, USA, Inc., Lakeland, FL.; 4 pages.

Research & Case Studies, Conwed Hydro-Mulch 3000 Captive Caribou Toxicity Test, www.conwedfibers.com/documentation/tests/caribou.html printed Jul. 29, 2003, Washington State University, University, Natural Resource Sciences, Pullman, WA.; 2 pages.

Hydromulch 3000 Mechanically-Bonded Fiber Matrix, www.conwedfibers.com/mbfm/index.html, printed Jul. 29, 2003, 3 pages.

Hydraulic Mulch Additives, Dye Crystals, www.conwedfibers.com/additives/dye crystals.html, printed Jul. 29, 2003, 2 pages.

Kate Goff, Research & Case Studies, Project Profile: "Quanartine Landfill", Erosion Control Magazine, www.conwedfibers.com/documentation/cases/quarantine_hill..., printed Jul. 29, 2003, 4 pages.

Hydropam Tackifier for Maximizing Plant Establishment, Material Safety Data Sheet, U.S. Department of Labor, OSHA, Jan. 15, 1997, 4 pages.

Dale Gadd, Hydraulic Planting Technology, Golf Course Management, Aug. 1990, 4 pages.

Miller, Stanley and Terry Howard, Repairing Landslides with Geotechnical and Erosion Control Tools, Erosion Control, Jun. 1999, page 43-50.

Staib, Bob, Soil Fetilizers: Fertilizing for Rapid Revegetation and Sustained Growth, Land and Water, Mar./Apr. 2000, 2 pages.

Tilton, Joseph Lynn, Hydroseeding, the Cost-Effective Answer to Erosion Control; Erosion Control; Mar. 2000, 52-63.

Trott, John, Hydraulic Seeding & Stabilization; Erosion Control; Nov./Dec. 2000, pp. 56-61.

Salmon-Lost Trail; Erosion Control; Jun. 1999, pp. 66-67.

Engineering Fibers to Fix Erosion Problems; Erosion Control; Mar. 2000, pp. 25-26.

Tobiason, Scott, David Jenkins, Ed Molash, Stacey Rush; Polymer Use and Testing for Erosion and Sediment Control on Construction Sites; Erosion Control, Jan./Feb. 2001, pp. 90-101.

O'Malley, Penelope, Slope Stabilization; Erosion Control, Jul./Aug. 1996, pp. 66-77.

Hager, Mary Catherine, Reclaiming Coal-Mining Sites: Challenges in Erosion Control; Erosion Control; Jul./Aug. 2001, pp. 48-53.

Project Profile Amazon Creek: Restoration of a Wetland; Erosion Control, Apr. 2000, p. 28-29.

Straw & Fiber Mulch Binders; www.terra-mulch.com/binders/tacking; website printout Jul. 27, 2003, 2 pages.

Resource Center; www.terra-mulch.com/resources_cases;website printout Jul. 27, 2003, 6 pages.

Polyacrylamides: How Do They Work?; Soil and Water Conservation Society newsletter RUNOFF; Winter 1997, 2 pages.

Slope Stabilization: Gale Ranch Slope Stabilization; Land and Water; Nov./Dec. 2001; page 28-29.

Urroz, Gilberto E,; Test of CONWED BFM 3000 with and without fiber, and a competitive BFM for Erosion Control and Plant Growth Enhancement Under Simulated Rain and Sunlight; Jul 1998; Utah State University. Logan, UT, 16 pages.

Sojka, R.E. et al.; Polyacrylamides in Irrigated Agriculture—Final Report; Jun. 2000; National Program for Irrigation Research and Development, Kimberly, ID. 32 pages.

Polyacrylamide as a Soil Stabilizer for Erosion Control—Final Report No. WI 06-98; Jan. 2001; Wisconsin Department of Transportation; 29 pages.

Erosion Control Product Acceptability Lists (PAL) for Multi-Modal Applications; Jan. 2001 Edition; Wisconsin Department of Transportation; 30 pages.

Manual for Erosion and Sediment Control in Georgia; Fifth Edition 2000; Georgia Soil and Water Conservation Commision; Athens, GA; 15 pages.

Swerin, Agne; Dissertation for the degree of Doctor of Technology performed at STFI; Feb. 16, 1995; 40 pages.

Swerin, Agne; Flocculation and fibre network strength in papermaking suspensions flocculated by retention aid systems; Royal Institute of Technology; Stockholm, Sweden; 1995; pp. 32-62.

Texas Department of Transportation 1999 Evaluation Cycle; Class I "Slope Protection" Application of EarthBound; Jun. 30, 2000; 4 pages.

New York State Department of Transportation; Standard Specification Section 612-Sodding & Placing Erosion Control Materials and 713-07 Erosion Control Materials; Jun. 23, 1998. 10 pages.

Website printout: http://hazard.com/msds/mt/cyanamid/files/249; dated Jul. 10, 2002; 6 pages Rosa-Espinosa, et al.; Sediment and Runoff Control on Construction Sites Using Four Application Methods of Polyacrylamide Mix; 1999; 8 pages.

Erosion & Sediment Control Technical Bulletin #2; Anionic Polyacrylamide Guidance; Jul. 2002; 7 pages.

Website printout: http://www.copa.org/2001/11-final/partll.html: Lemon Lane Final Report; Jun. 2001; 5 pages.

Website printout: http://kimberly.ars.usda.gov/sojka/pamphlet.html; SOJKA, et al.; The PAMphlet; Feb. 19, 2001; 5 pages.

Stormwater Management: Pinellas Country Leads the Way; Land and Water; Jan./Feb. 2002; p. 50-51.

Tilton, Joseph Lynn; Winning Hydroseeding Strategies; Erosion Control; May/Jun. 2002; pp. 40-49.

Brzozowski, Carol; Carpets of Grass; Erosion Control; Jan./Feb. 2003; pp. 24-31.

Hager, Mary Catherine; Reclaiming Coal-Mining Sites: Challenges in Erosion Control; Erosion Control; Jul./Aug. 2001; pp. 48-53.

Tilton, Joseph Lynn; Giving Seeds a Better Bed; Erosion Control; Mar./Apr. 2002; pp. 30-37.

Hydroware, Hardware for Hydroseeders (catalog); Linwood Supply; Jan. 1998; 12 pages.

Model T60 Series II HydroSeeder; brochure; FINN Corporation; Copyright 1997.; 2 pages.

* cited by examiner

COMPOSITIONS AND METHODS FOR RESISTING SOIL EROSION AND FIRE RETARDATION

CROSS-REFERENCE TO RELATED APPLICATIONS

The present application is a continuation-in-part of U.S. patent application Ser. No. 10/368,904 filed Feb. 18, 2003 now U.S. Pat. No. 6,835,761, entitled SOIL FORMULATION FOR RESISTING EROSION, which is a continuation of U.S. patent application Ser. No. 09/897,093, filed Jun. 29, 2001 now U.S. Pat. No. 6,562,882, entitled SOIL FORMULATION FOR RESISTING EROSION AND SETTLEMENT CONTROL, now issued as U.S. Pat. No. 6, 562,882.

STATEMENT RE: FEDERALLY SPONSORED RESEARCH/DEVELOPMENT

Not Applicable

BACKGROUND OF THE INVENTION

Soil erosion, namely, the detachment of particles of soil and surficial sediments and rocks, is a serious problem recognized worldwide. Essentially, erosion occurs via the forces of wind and water that facilitate the movement of topsoil from one place to another. Of such forces, water erosion is generally considered more detrimental to soils both by the volume of soil removed, and the area of land influenced. Moreover, although soil erosion can potentially occur in any land surface, sloping areas mantled with soil or loose sediment are particularly susceptible to such forces and are exceptionally vulnerable to the extent the same lack any type of vegetation, as occurs during grading or when such areas have been attacked by wildfires. Indeed, current data seems to suggest that in the United States, soil has recently been eroded at about seventeen times the rate at which it forms. Further data suggests that soil erosion rates in Asia, Africa and South America are about twice as high as that in the United States.

Due to its significance, several attempts have been made to prevent or substantially reduce soil erosion. Among the more well-known of such methods include agricultural practices, such as contour farming and terracing, no-till cultivation, strip farming and polyvarietal cultivation. Other well-known approaches include adding organic matter to soil which, by biochemical degradation, produces polysaccharides that are cohesive in nature and act to cause soil particles to stick together and resist erosion. Along these lines, products have been introduced to provide at least temporary erosion control, particularly with respect to slopes and the like until such time as trees and vegetation can take root to resist erosion. Such products include bonded fiber matrices, such as Soil Guard® produced by Mat Inc., of Floodwood, Minn., which comprises a continuous layer of elongated fiber strands held together by a water-resistant bonding agent. Such product is operative to eliminate direct raindrop impact on soil and further includes high water-holding capacity that eventually biodegrades into plant nutrients.

Such products, however, are of limited effectiveness and often do not provide the degree of soil erosion resistance as is typically desired, particularly for use in relation to man-made slopes and terraces in arid regions, such as southern California and Arizona. Such lack of effectiveness can and does often affect residential and commercial property development where man-made slopes are developed to support such structures and the like. In this regard, inadequate soil erosion resistance can culminate in the destruction of condemnation of buildings and dwellings, as well as create substantial storm water pollution. Moreover, such matrices can inhibit new plant growth by acting as a barrier against proper germination.

Likewise not heretofore addressed by the prior art is the risk posed to slopes, hillsides, and the like whose vegetation has been substantially eradicated by wildfires. In this regard, the vegetation that would normally be present upon such hillsides and slopes typically act as a barrier to resist soil erosion; however, in the absence of such vegetation such earthen structures quickly erode, as discussed above. Indeed, wildfires in Southern California and Colorado evidence the extensive damage that can occur to exposed mountains and hillsides following exposure to a wildfire and even the best management practices for resisting erosion can only afford a moderate degree of protection. Along these lines, from a soil erosion control standpoint, it is generally agreed that avoiding the destruction of vegetation by wildfires will substantially eliminate the threat of erosion to a given mountain, hillside or slope and thus substantially reduce, if not eliminate, the need for supplemental erosion control via the use of one or more prior art erosion control practices.

Accordingly, there is a substantial need in the art for compositions and methods for resisting soil erosion to a much greater degree than prior art compositions and methods that is further operative to act as a fire retarding agent that substantially reduces risk of destruction to vegetation by wildfires and the like. There is further need in the art for such compositions and methods that are non-toxic, biodegradable, can be readily deployed utilizing existing, commercially-available application techniques, and acts to serve as a soil conditioner and fire retarding agent. Still further, there is a need in the art for such a composition and method that is of simple formulation, relatively inexpensive to produce, and utilizes known, commercially-available materials.

BRIEF SUMMARY OF THE INVENTION

The present invention specifically addresses and alleviates the above-identified deficiencies in the art. In this regard, the present invention is directed to compositions and methods that serve the dual purpose of eliminating or substantially reducing soil erosion while also serving as a fire retarding agent. According to the preferred embodiment, the composition comprises an aqueous mixture of an organic material, which may comprise cellulose, mulch or a combination seed and mulch and a hydrophilic polymer, the latter of which preferably comprises polyacrylamide or a copolymer of polyacrylamide having anionic functional groups, the latter preferably consisting of sodium acrylate. The soil erosion fire resisting composition may further be provided in the form of a reconstitutable powder or liquid concentrate comprised of the organic material mixed with polyacrylamide. In the latter embodiment, such composition is formulated such that the polymer or copolymer is present in an amount ranging from 0.25 to 5% by weight of said composition and said organic base comprises the remaining 95.00 to 99.75% of the composition weight. To reconstitute the composition, the same is preferably mixed with water in a ratio of one pound organic base/polymer per one and one-half gallons of water to one pound organic matter/polymer to six gallons of water. In further refinements of the invention, the polymer component may comprise EarthGuard® soil-erosion resistant product produced by Terra Novo, Inc. of Bakersfield, Calif.

As for the methods of the present invention, the same essentially comprise providing a composition of the aforementioned variety and applying the same to an area of land sought to be treated to consequently resist fire and soil erosion. According to the preferred embodiment, the method comprises forming a first admixture of water and polymer, and thereafter adding the organic material to form a second admixture. The resultant admixture may be hydraulically applied, as per conventional soil erosion resistant compositions, such as bonded fiber matrix. Advantageously, the application of the compositions of the present invention are effective immediately upon application in resisting fire and soil erosion and are non-toxic and biodegradable. Moreover, such methods can be practiced in any kind of weather and on any kind of soil, as well as applied directly to brush and existing vegetation, and is especially well-suited for use on slopes and the like.

It is therefore an object of the present invention to provide compositions and methods for resisting soil erosion that can resist soil erosion to a far greater degree than prior art compositions and methods, particularly in relation to slopes and the like that further can impart fire resistant properties.

Another object of the present invention is to provide compositions and methods for resisting fire and soil erosion that is non-toxic, biodegradable and safe for the environment.

Another object of the present invention is to provide compositions and methods for resisting fire and soil erosion that is of simple formulation, relatively inexpensive, and can be readily applied utilizing conventional application equipment and techniques.

Still further objects of the invention are to provide compositions and methods for resisting fire and soil erosion that are effective immediately upon application, can be applied in any type of weather, and can be utilized on virtually any type of soil.

BRIEF DESCRIPTION OF THE DRAWINGS

These as well as other features of the present invention will become more apparent upon reference to the drawings.

DETAILED DESCRIPTION OF THE INVENTION

Figure 1:
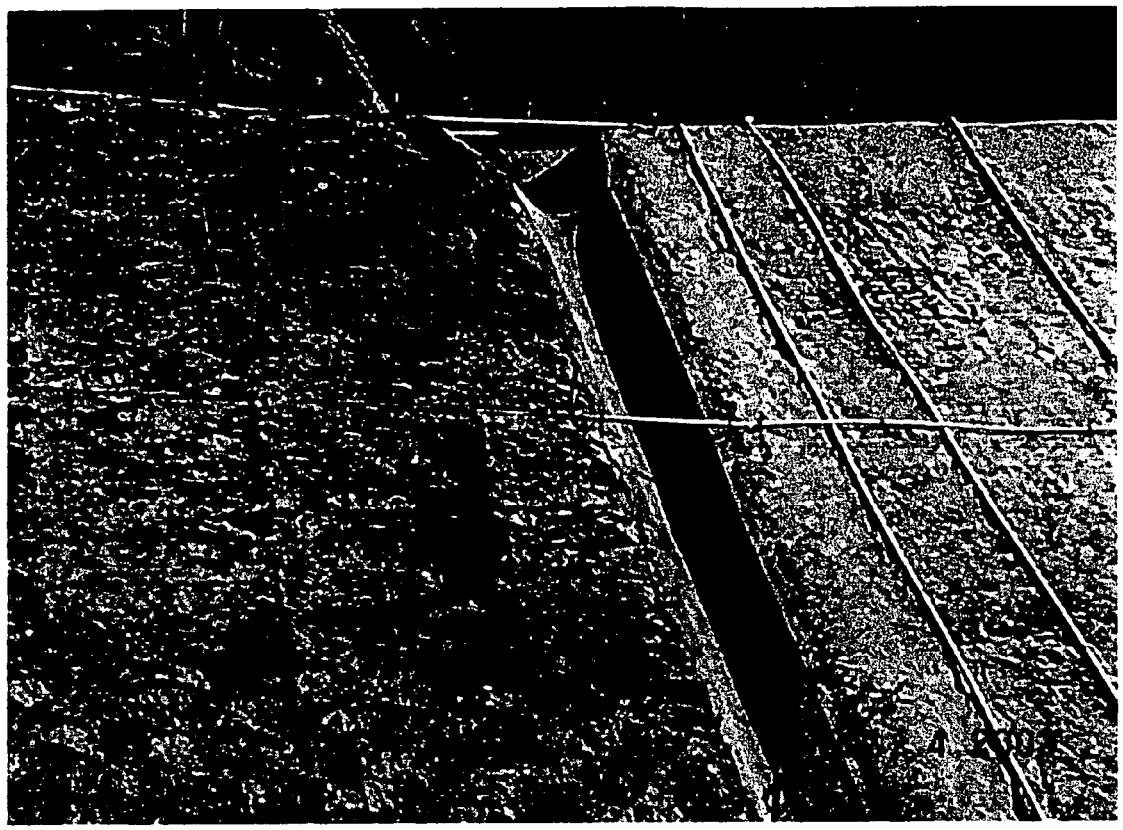
FIG. 1 is a photograph taken on Nov. 4, 2003 of an area of land effected by the Simi Valley fire occurring approximately one week prior in Southern California. Such photograph depicts in the background acreage charred by such wildfire and in the foreground, which depicts an area of land treated by the methods and compositions of the present invention prior to such fire, shows vegetation that was not effected by such nearby fires.

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

The present invention is directed to compositions and methods for achieving the dual purpose of preventing or substantially reducing soil erosion and imparting fire-resistant properties. With regard to the compositions, there is provided the combination of a polymer and an organic material that, in use, are mixed with water to form an aqueous admixture. In this respect, the compositions of the present invention may comprise either the polymer/organic material elements alone, which may be mixed with water, or, alternatively, an aqueous solution containing such components.

With respect to the former, the polymer element comprises polyacrylamide. Such polymer, which is well-known in the art, comprises $CH_2:CHCONH_2$ linear polymers polymeric through the vinyl groups. Preferably, the polymer element is formulated as a copolymer of polyacrylamide having anionic functional groups, the latter preferably consisting of sodium acrylate monomers. It should be understood, however, that copolymers of polyacrylamide that include cationic and non-anionic functional groups are contemplated as falling within the scope of the present invention. In a more highly refined embodiment, the polymer component comprises a copolymer of acrylamide and sodium acrylate that is commercially available and sold under the trademark EarthGuard® by Terra Novo, Inc. of Bakersfield, Calif. Such commercial formulation utilizes a copolymer of acrylamide and sodium acrylate present in a ratio of approximately 70:30; however, different ratios of acrylamide:sodium acrylate should also be deemed to fall within the scope of the present invention. As to the organic material, the same preferably comprises either cellulose, mulch and/or seed and mulch. With respect to the latter components, the same are well-known in the art. In this regard, such component may include materials such as recycled paper mulch and/or wood fiber mulch, among several other organic materials, fibers, and the like.

The basic aforementioned components that comprise the invention, by percent weight with regard to the reconstitutable mixture, encompass the following ranges:

| COMPONENT | PERCENT BY WEIGHT |
| --- | --- |
| Polymer | 0.25% to 5.00% |
| Organic Material | 99.75% to 95.00% |

It is understood that the percentages of the two components above will total 100% by weight and if other materials are included in the concentrate formulation, the percentages of all ingredients will total 100% by weight.

In a more highly refined embodiment, the composition comprises the mixture of a polymer present in an amount of approximately 1.25% by weight and the organic material in an amount of 98.75% by weight. Again, to the extent additional materials are included, the percentages of all ingredients will total 100% by weight.

For application, the polymer/organic composition will be mixed with water. To that end, it is contemplated that water may be added in the amount of one and one-half to six gallons per pound of polymer/organic material. Generally, it is contemplated that a minimum application will include five hundred pounds of polymer/organic material mixed with three thousand gallons for distribution per acre. On the other hand, to the extent a maximum amount of soil erosion/fire protection is desired, the compositions of the present invention may be applied such that up to 4,000 pounds of organic material (with proportional amount of the polymer element added in addition) per five to six thousand gallons of water will be applied per acre. In a most extensive application, it is contemplated that up to 7,000 gallons of water per acre could be utilized.

In further refinements of the invention which incorporate the use of EarthGuard® as the polymer component, there is set forth below in Table 1 general application rates to provide seasonal erosion control for slopes having the specified degree of inclination. Such application rates are per acre and specifically contemplate mixture with 3,000 gallons of water for use on loamy soils that are balanced in organic matter and nutrients, with maximum rainfall of twelve to fifteen inches over a four to five month period.

contact with one another. With respect to the latter, it is currently contemplated that the polymer component, at a minimum, must be added directly to the still water flow and thereafter the mixture is circulated for a minimum of ten minutes prior to application of the resultant admixture.

Advantageously, the compositions of the present invention are non-toxic, biodegradable and can be applied to any types of soils in any type of weather conditions. Moreover, in studies involving the aforementioned compositions, the same were shown to reduce erosion and sediment runoff by approximately 95% when compared to untreated soil conditions. As is known in the art, such reduction in sediment runoff is comparable, if not better, to the best performing best management practices known in the art. Moreover, by simply using well-known and commercially available materials, in particular the polymer component of the present invention, the compositions and methods of using the same according to the present invention are substantially more cost effective than prior art compositions and methods.

Figure 2:
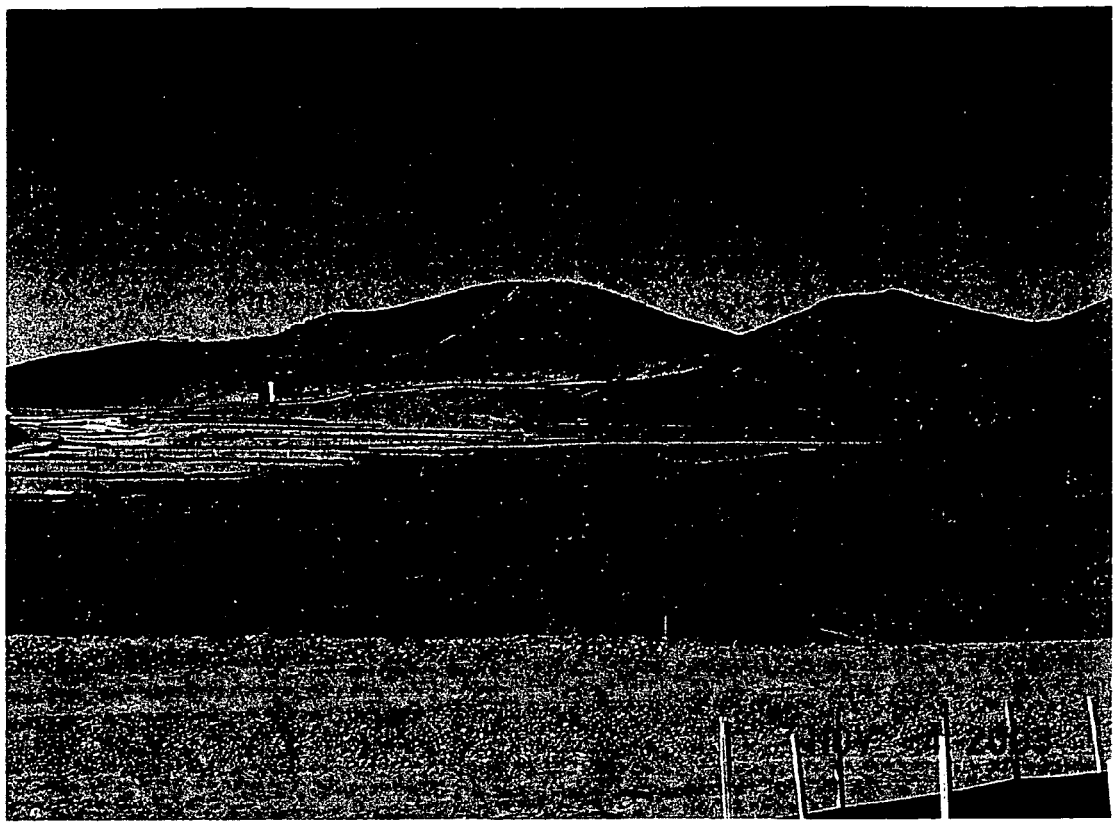
FIG. 2 is a photograph taken in the same general area depicting a small patch of vegetation sprayed with the compositions and methods of the present invention prior to such fire, which had not burned as compared to the surrounding area.
Figure 3:
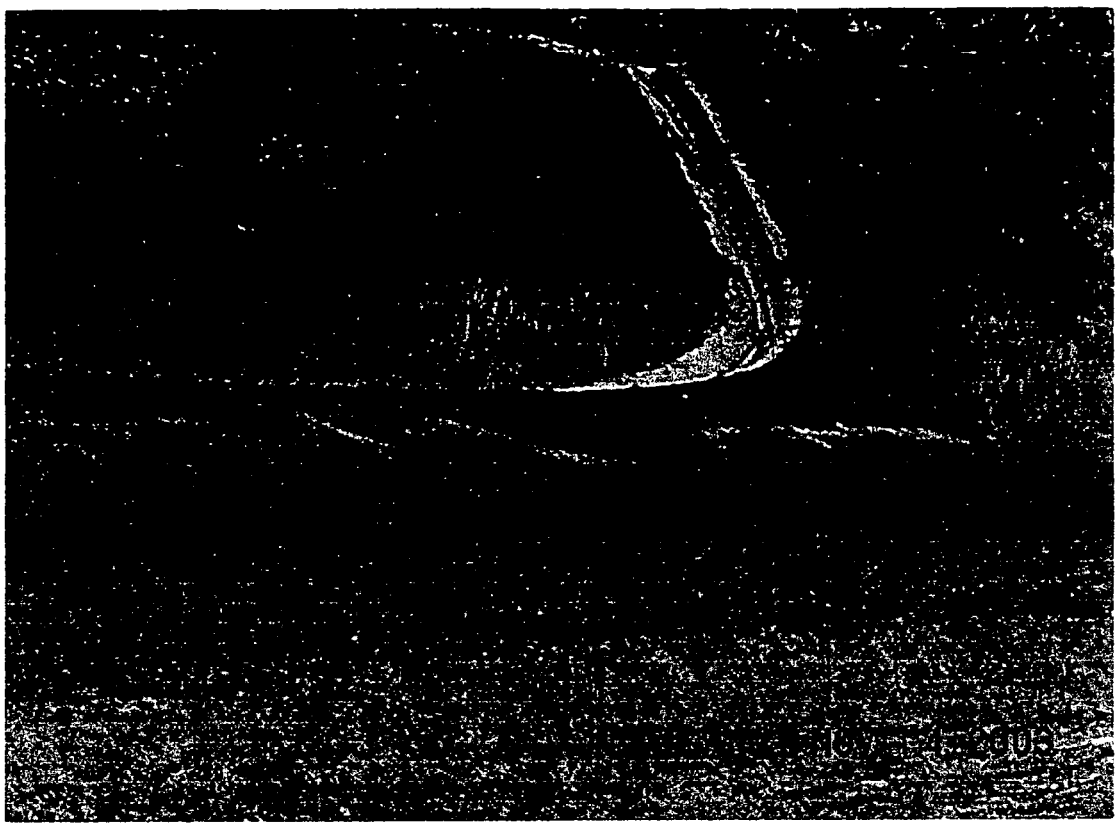
FIG. 3 is a photograph taken in the same general vicinity showing an area of vegetation that had been burned by wildfires that stopped abruptly at the point where an area of land had been treated with the compositions and methods of the present invention.
Figure 4:
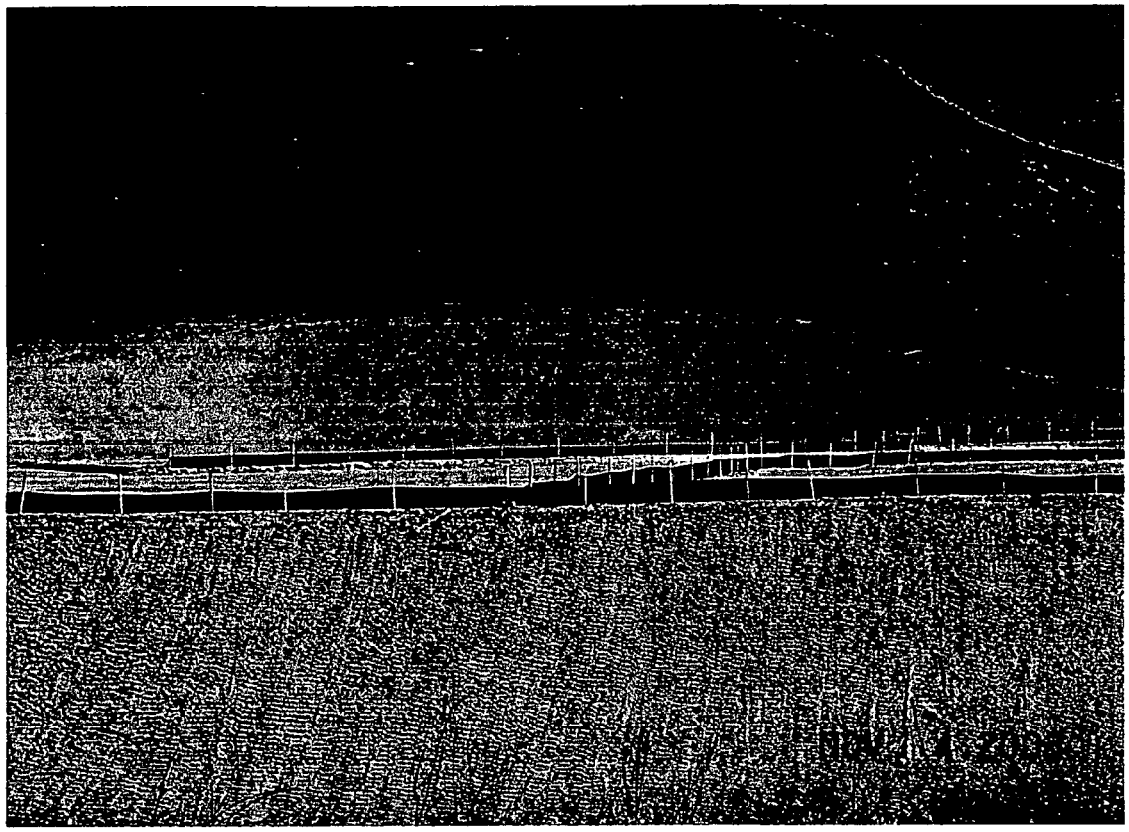
FIG. 4 is a photograph taken in the same general vicinity showing an area of vegetation that had been burned by wildfires that stopped abruptly at the point where an area of land had been treated with the compositions and methods of the present invention.
Figure 5:
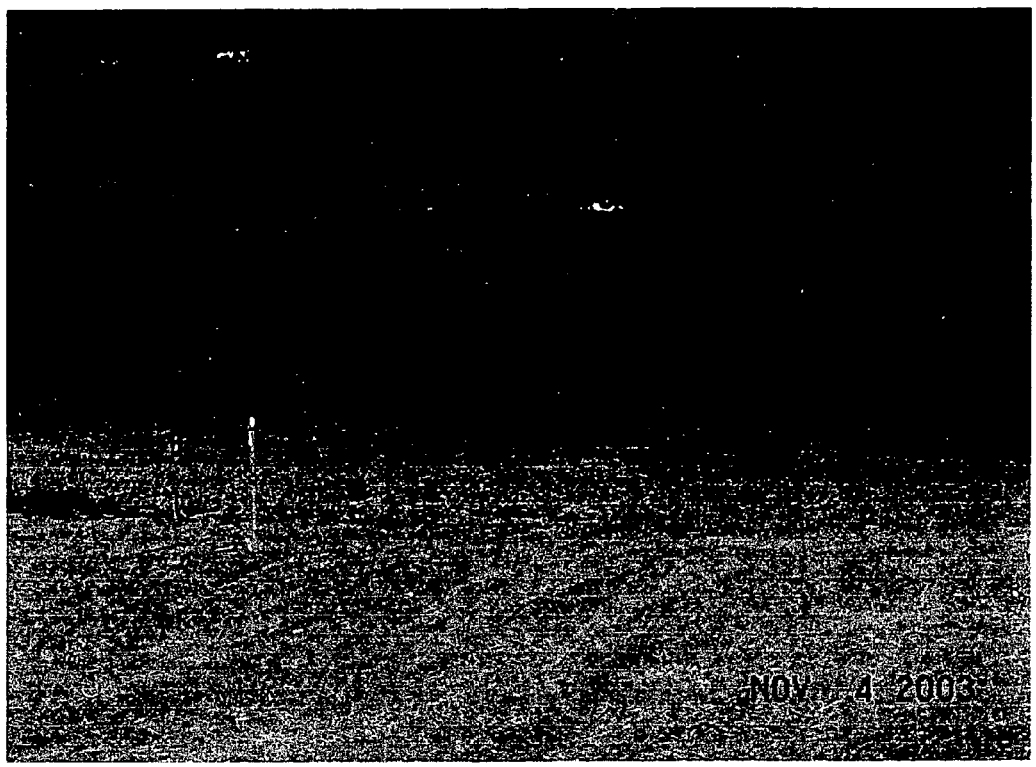
FIG. 5 is a photograph depicting on the left side thereof, and area of land that was untreated and on the right an area of land that had been treated with the compositions and methods of the present invention, the latter showing no evidence of any type of fire damage.
Figure 6:

In addition to providing superior soil erosion resistant properties, the compositions and methods of the present invention further have unexpectedly shown the ability to provide fire-retardant properties and thus are further believed to be useful in substantially reducing, if not eliminating, potential damage to vegetation by wildfires. As illustrated in FIGS. 1-5, which depict post fire damage that occurred in the Simi

| Slope Gradient | 6:1 | 5:1 | 4:1 | 3:1 | 2:1 | 1.5:1 | 1:1 |
|---|---|---|---|---|---|---|---|
| Gals of Earth-Guard ® Per Acre | 4 | 5 | 6 | 7 | 8 | 9 | 10 |
| (lbs) Mulch Per Acre | 800-1,000 | 800-1,000 | 1,000-1,200 | 1,200-1,500 | 1,500-2,000 | 1,500-2,000 | 2,000-2,500 |

To the extent it is desired to impart soil erosion resistance in the spring with some rain still expected, Table 2 sets forth herebelow general rate guidelines for such applications, again contemplating per acre application with mixture with 3,000 gallons of water.

Valley fires that occurred during the month of November, 2003. Such photographs illustrate areas of land that had been treated with the compositions and methods of the present invention prior to such fire and are shown as clear areas or areas having vegetation, as compared to the blackened or

| Slope Gradient | 6:1 | 5:1 | 4:1 | 3:1 | 2:1 | 1.5:1 | 1:1 |
|---|---|---|---|---|---|---|---|
| Gals of Earth-Guard ® Per Acre | 2 | 3 | 4 | 5 | 6 | 7 | 8 |
| (lbs) Mulch Per Acre | 800-1,000 | 800-1,000 | 1,000-1,200 | 1,200-1,500 | 1,500-2,000 | 1,500-2,000 | 2,000-2,500 |

With respect to application, the same may be applied by any of a variety of techniques known in the art. For example, the compositions of the present invention may be applied via hydroseeders or by aerial application, such as by helicopters or aircraft, among others well-known in the art. For application by aircraft, such as conventional 2500 gallon tanker aircraft frequently used in firefighting applications, it is contemplated that multiple passes may be required. As will be appreciated by those skilled in the art, in light of the compositions of the present invention including a high amount of polyacrylamide and/or copolymers of polyacrylamide and sodium acrylate, the resultant admixture produced by adding the aqueous component with the polymer/organic material will consequently produce a gel or slurry that will require constant agitation, such as through the use of agitators and the like, or by thorough mixing at the time such ingredients are in charred areas that had been destroyed by the fires. Quite unexpectedly, following recent application of the compositions and methods of the present invention, virtually no fire damage occurred to any areas of land treated thereby. In this respect, it is contemplated that application of the compositions and methods of the present invention according to the aforementioned teachings will likewise sufficiently impart a sufficient degree of protection to vegetation and/or bear slopes and hillsides that would otherwise become damaged by virtue of being exposed to wildfires and the like. Accordingly, by virtue of such properties, it is believed that the compositions and methods of the present invention can effectively serve the dual purpose of providing a fire retardant or resistant property operative to resist fire and thereafter resist soil erosion brought about by exposure to wind, rain and typical erosion forces.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A method for concomitantly reducing soil erosion from and imparting fire-resistance to an area of land having vegetation growing thereon, the method comprising the steps:
   a) providing a copolymer of linear polyacrylamide and sodium acrylate;
   b) providing between 1,000 to 4,000 pounds organic material;
   c) providing between 3,000 to 7,000 gallons of water;
   d) mixing said water in step c) with said polymer in step a) to form a first admixture;
   e) mixing the admixture of step d) with said organic matter in step b) such that the copolymer is present in an amount between 0.25% to 5.00% by weight of the combined weight of said copolymer and said organic material; and
   f) applying said admixture in step e) to said area of land and said vegetation growing thereon.

2. The method of claim 1 wherein in step c), between 3,000 to 6,000 gallons of water are provided.

3. The method of claim 1 wherein in step b), said organic material is selected from the group consisting of cellulose and mulch.

4. The method of claim 3 wherein said mulch is selected from the group consisting of paper mulch and wood fiber mulch.

5. The method of claim 1 wherein step f) is accomplished via hydroseeding or aerial application.

6. A method for concomitantly reducing soil erosion from and imparting fire-resistance to an area of land having vegetation growing thereon, the method comprising the steps:
   a) providing a linear polyacrylamide copolymer;
   b) providing between 1,000 to 4,000 pounds of an organic material selected from a group consisting of paper mulch, wood fiber mulch, and cellulose;
   c) providing between 3,000 to 7,000 gallons of water;
   d) mixing said water in step c) with said copolymer in step a) to form a first admixture;
   e) mixing the admixture of step d) with said organic matter in step b) such that a second admixture is formed wherein said copolymer is present in an amount between 0.25% and 5.00% by weight of the combined weight of said copolymer and said organic material; and
   f) applying said admixture in step e) to said area of land and said vegetation growing thereon, said area of land having a size ranging from one-half acre to one acre.

7. The method of claim 1 wherein in step e), said copolymer is present in an amount between 1.25% to 5.00% by weight of the combined weight of said copolymer and said organic material.

8. The method of claim 6 wherein in step e), said copolymer is present in an amount between 1.25% to 5.00% by weight of the combined weight of said copolymer and said organic material.

9. The method of claim 6 wherein in step c), between 5,000 to 6,000 gallons of water are provided.

\* \* \* \* \*